May 25, 1965 H. K. SCHILLING 3,185,256
STOP BRAKE
Filed Dec. 26, 1961
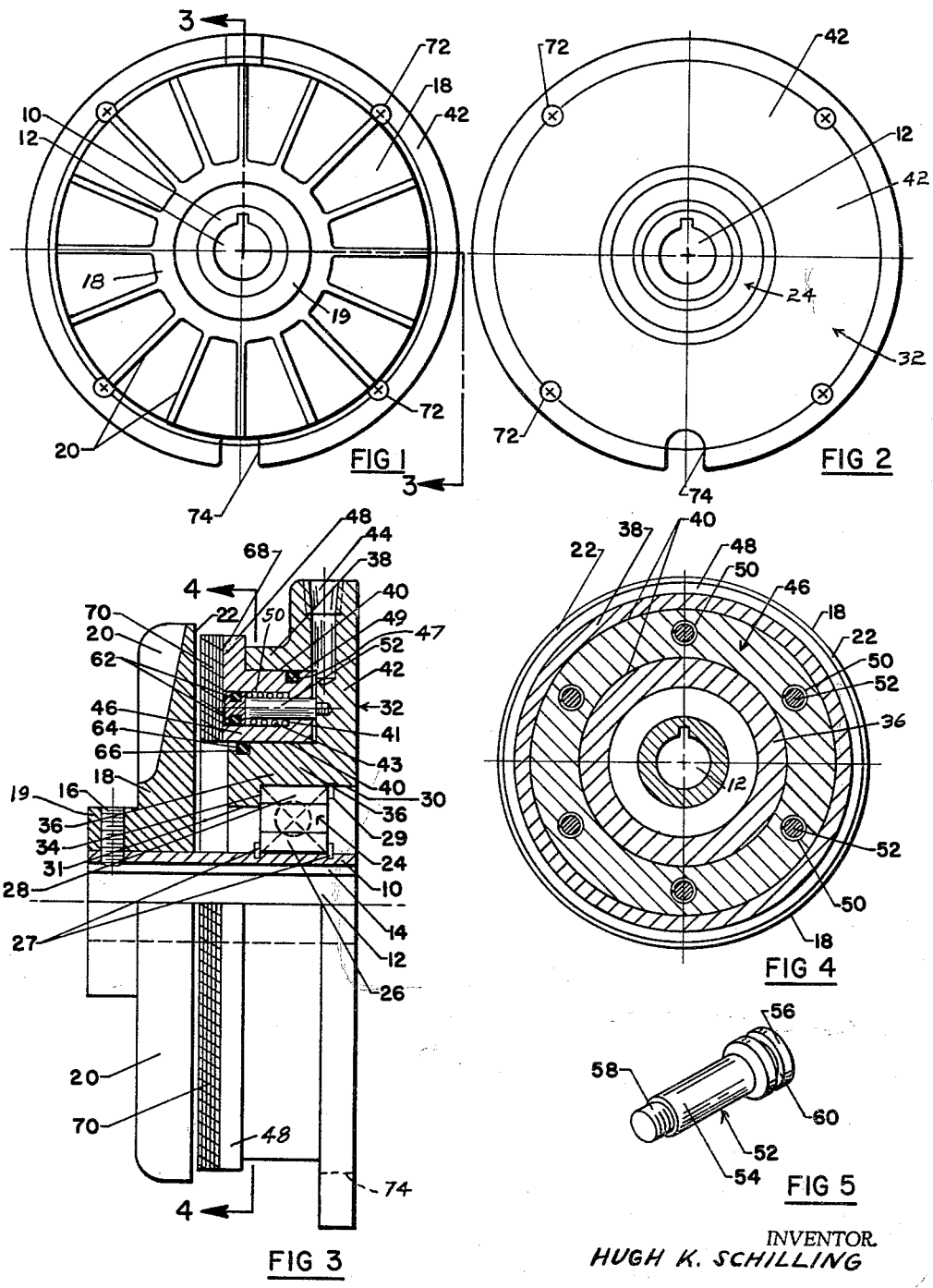
INVENTOR.
HUGH K. SCHILLING
BY
Caswell, Lagaard & Wicks
ATTORNEYS United States Patent Office 3,185,256
Patented May 25, 1965

3,185,256
STOP BRAKE
Hugh K. Schilling, St. Paul, Minn., assignor to Horton Manufacturing Co., Inc., Minneapolis, Minn.
Filed Dec. 26, 1961, Ser. No. 162,061
4 Claims. (Cl. 188—71)

The invention relates broadly to a braking device and more particularly to a brake actuated by a pressurized fluid medium for the stopping of rotating parts.

It is an object of the invention to provide an air brake which can absorb high amounts of energy for short periods of time, that is, for short intermittent engagements.

It is also an object to provide a brake having a circular piston concentric with a shaft and mounted in a cylinder in the form of an annular concentric recess with which the torque is taken up by a multiplicity of shoulder bolts evenly spaced in the piston.

It is a further object to provide a brake which has ease of mounting and is of a compact design thereby requiring less mounting room. It is an additional object to provide a brake which is easy to assemble and maintain and which will stand a greater degree of heat than present day brakes due to quick dissipation of heat from the friction surface. The brake is of a construction whereby it can take the place of an electric brake in the low torque ranges and being air operated it can be used in explosive atmosphere.

It is a still further object to provide a brake having an anti-friction bearing having its inner race fastened to a hub and its outer race fastened to the inside of the air cylinder, the purpose of which is to align the brake disc and piston cylinder assemblies with each other and to take the thrust of the friction facing against the brake disc when the brake is engaged.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:
FIGURE 1 is a front view of the brake.
FIGURE 2 is a rear view thereof.
FIGURE 3 is a section on the line 3—3 of FIGURE 1.
FIGURE 4 is a section on the line 4—4 of FIGURE 3.
FIGURE 5 is a perspective view of the shoulder bolt removed from the brake unit.

Referring to the drawings in detail, the brake A includes the hub 10 which is bored out and keyed to the driven shaft 12 by means of the key 14 and held in position by the screw 16. A brake disc 18 is provided which is press fit upon the hub 10 and also secured by the screw 16. The brake disc 18 has formed on the outer face thereof the radially extending cooling fins 20 and the inner flat surface 22 is the braking surface. The brake disc 18 includes the outer hub 19 which mounts the screw 16.

Further provided is the anti-friction bearing 24, the inner race 26 of which is press fit on the hub 10 and secured with the retainer rings 27 with the outer race 28 press fit in the inner cylindrical recess 30 of the cylinder body 32 and secured with the retainer ring 29 thereby allowing relative movement between the hub 10 and the body 32. The recess 30 is formed concentric with the axial bore 31 of the body 32. The bearing 24 mounts the cylinder body 32 and aligns the brake disc 18 and the cylinder body, one with the other. The bearing 24 also takes the thrust of the friction facing, hereinafter referred to, against the disc when the brake is engaged.

The cylinder body 32 also includes the annular shoulder 34 of recess 30 against which the bearing 24 is positioned. The cylinder body 32 also includes the inner and outer concentric annular flange portions 36 and 38, respectively, which form the annular cylinder 40 concentric with the shaft 12.

The annular flange portions 36 and 38 terminate in the annular substantially flat back portion 42. The back portion 42 is formed with the air inlet 44 which communicates with the annular cylinder 40.

The numeral 46 designates an annular piston formed with the outer annular flange 48, the piston 46 being movable within the cylinder 40 as hereinafter described. The annular flange 48 abuts the outer edge of the outer flange 38 of the cylinder body 32 when the piston 46 is fully within the cylinder. The outer peripheral edge of the piston 46 is formed with a recess 47 which receives the O-ring 49 thereby making a sealing contact between piston 46 and the outer wall of cylinder 40. The piston 46 is further formed with the evenly spaced holes 50 in each of which is mounted a shoulder bolt 52. A shoulder bolt 52 includes the main cylindrical body portion 54 with the head portion 56 formed on the outer end and the threads 58 formed on the inner end. The head 56 is formed with an annular groove 60 in which is mounted the O-ring 62 which makes sealing contact with the hole 50 in which it is mounted. Each of the inner threaded ends 58 of the bolts 52 is threadedly engaged with the flat back portion 42.

The inner end of the hole 50 is formed with a shoulder 41, and a coil spring 43 is mounted on the bolt 52 between the shoulder 41 and the head 56 thereby normally urging the piston 46 inwardly of the cylinder 40.

The inner peripheral edge of the cylinder 40 is formed with a recess 64 which mounts the O-ring 66 and which makes sealing contact between the inner wall of the piston and the inner wall of the cylinder 40.

Secured to the outer face portion 68 of the outer flange 48 and piston body 46 is the annular friction facing 70 for engagement with the braking surface 22 of the disc 28.

The brake operates in the following manner:
Air under pressure or any fluid medium is introduced into the inlet 44 from which it passes into the cylinder 40 with which the inlet is connected and where the pressure forces the piston 46 outwardly against the action of the springs 43. As a result, the friction facing 70 is forced into contact with the inner flat surface 22 of the brake disc thereby causing the shaft 12 to stop. The shaft 12 is released and allowed to rotate by reducing the air pressure against the piston 46, and as a result the piston moves inwardly due to the action of the springs 43 thereby withdrawing the friction facing 70 out of contact with the brake surface 22.

The flat back portion 42 of the cylinder body 32 is formed with a multiplicity of bolt holes 72 whereby the brake A may be mounted on a machine frame. The portion 42 has a slot 74 formed therein at the outer edge for accommodating a torque arm (not shown) which may be used to prevent the brake from rotating.

The bond between the friction facing 70 and the piston flange 48 is not perfect, and there is therefore a slight venting between the head 56 of the shoulder bolt 52 and the friction facing. Further, the seal between the inner end of the bolt 52 and the piston is not perfect and therefore a slight venting exists whereby no great amount of compression exists between the head 56 and shoulder 41.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a fluid operated brake having a cylinder body, an annular cylinder in said body, an annular piston in said annular cylinder movable axially along said annular cylinder, a hub coaxial with said annular cylinder and piston and disposed adjacent thereto, means for mounting said cylinder body and hub for relative rotation and friction members between said piston and hub, the combination of
   (a) a plurality of cylinders extending longitudinally in said annular piston parallel to the axis thereof, and open at one end,
   (b) a plurality of bolts, one for each cylindrical cylinder and disposed within said cylinders,
   (c) said bolts having shanks of lesser diameter than the diameters of said cylinders to provide annular spaces therebetween,
   (d) cylindrical guide means carried by said annular piston concentric with the cylinders and at the ends thereof opposite the open ends and of lesser diameter than said cylinders and slidable along the shanks of said bolts,
   (e) heads on said bolts serving as pistons and slidable along said cylinders,
   (f) said bolt heads having annular grooves extending through the outer surfaces thereof,
   (g) sealing rings in said grooves engaging the surfaces of said cylinders,
   (h) compression coil springs in said annular spaces acting between said guide means and bolt heads to move said annular piston inwardly into said annular cylinder to disengage said friction members,
   (i) said guides and pistons restraining relative rotational movement between said annular piston and cylinder body.

2. A fluid actuated brake comprising in combination:
   (a) a shaft,
   (b) a hub secured on said shaft,
   (c) a brake disc, secured on said hub,
   (d) a single annular cylinder body mounted on said hub and concentric therewith,
   (e) bearing means connected to said cylinder body and said hub to allow said hub to rotate relative to said cylinder body,
   (f) said cylinder body having an annular recess forming a cylinder, concentric with said hub,
   (g) a single annular piston concentric with said hub and slidably mounted in said annular cylinder,
   (h) a sealing ring mounted on the outer surface of said piston for engagement with the outer wall of said annular cylinder,
   (i) a sealing ring mounted on the inner wall of said annular cylinder for engagement with the inner wall of said piston,
   (j) a friction facing carried by said piston for engagement with said brake disc,
   (k) said annular piston having a multiplicity of circumferentially spaced holes formed therein,
   (l) a multiplicity of circumferentially spaced shoulder bolts connected to said cylinder body and extending into said spaced holes,
   (m) each of said shoulder bolts having a grooved head portion,
   (n) an O-ring mounted in said grooved head portion for sealing engagement with the holes of said piston,
   (o) a coil spring mounted on each of said shoulder bolts between said head portion and said piston adapted to normally urge said piston and friction facing thereon from said brake disc,
   (p) means for admitting fluid pressure into said annular cylinder to cause said friction facing of said piston to bear against said brake disc against the action of said coil springs and stop said shaft,
   (q) said fluid pressure admitting means including an inlet hole extending radially outward of said annular cylinder into communication with the outer peripheral surface of said cylinder body.

3. A fluid actuated brake comprising in combination:
   (a) a shaft,
   (b) a brake disc connected to said shaft,
   (c) a single annular cylinder body concentric of said shaft,
   (d) bearing means connected to said cylinder body and said shaft to allow said shaft to rotate relative to said cylinder body,
   (e) said cylinder body having an annular recess forming a cylinder, concentric with said shaft,
   (f) a single annular piston concentric with said shaft and slidably mounted in and supported by said annular cylinder,
   (g) a friction facing carried by said piston for engagement with said brake disc,
   (h) a sealing ring mounted on the outer surface of said piston for engagement with the outer wall of said annular cylinder,
   (i) a sealing ring mounted on the inner wall of said annular cylinder for engagement with the inner wall of said piston,
   (j) said annular piston having a multiplicity of circumferentially spaced holes formed therein,
   (k) a multiplicity of circumferentially spaced shoulder bolts connected to said cylinder body and extending into said spaced holes,
   (l) each of said shoulder bolts having a grooved head portion; and
   (m) an O-ring mounted in said grooved head portion for sealing engagement with said holes of said piston,
   (n) a coil spring mounted on each of said shoulder bolts between said head portion and said piston adapted to normally urge said piston and friction facing thereon from said brake disc,
   (o) means for admitting fluid pressure into said annular cylinder to cause said friction facing of said piston to bear against said brake disc against the action of said coil springs and stop said shaft,
   (p) said fluid pressure admitting means including an inlet hole extending radially outward of said annular cylinder into communication with the outer peripheral surface of said cylinder body.

4. The brake as described in claim 3, wherein:
   (q) said friction facing has a first major torque transmitting surface and
   (r) a second major torque transmitting surface,
   (s) said first major torque transmitting surface facing said brake disc and disposed to bear against said brake disc when said friction facing engages said brake disc, and
   (t) said second major torque transmitting surface facing against said piston in a direction substantially opposite that in which said first torque transmitting surface is facing, whereby when said friction facing is made to bear against said brake disc by fluid pressure being admitted into said cylinder, the major part of the torque exerted by said brake disc is transmitted through said first and second torque transmitting surfaces to the annular piston.

(References on following page)

References Cited by the Examiner

UNITED STATES PATENTS

| | | | |
|---|---|---|---|
| 1,931,901 | 10/33 | O'Brien | 188—72 |
| 2,163,034 | 6/39 | Gosling et al. | 188—72 |
| 2,240,219 | 4/41 | Lambert | 188—152 |
| 2,888,103 | 5/59 | Armstrong | 188—152 |
| 2,955,682 | 10/60 | Kelley et al. | 188—152 |
| 2,970,673 | 2/61 | Isbell | 188—152 |
| 2,973,836 | 3/61 | Klaue | 188—152 |
| 3,038,575 | 6/62 | Hansen | 192—85 |
| 3,081,843 | 3/63 | Dotto et at. | 188—73 |

FOREIGN PATENTS

| | | |
|---|---|---|
| 51,523 | 6/42 | France. |
| 1,173,308 | 10/58 | France. |
| 274,144 | 7/27 | Great Britain. |
| 647,839 | 12/50 | Great Britain. |

ARTHUR L. LA POINT, *Primary Examiner.*

T. GRAHAM CRAVER, EUGENE G. BOLTZ,
*Examiners.*